P. A. McCARTY.
TRICYCLE BRAKE MECHANISM.
APPLICATION FILED APR. 1, 1912.
1,056,705.
Patented Mar. 18, 1913.
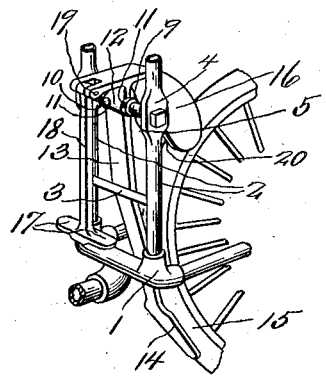
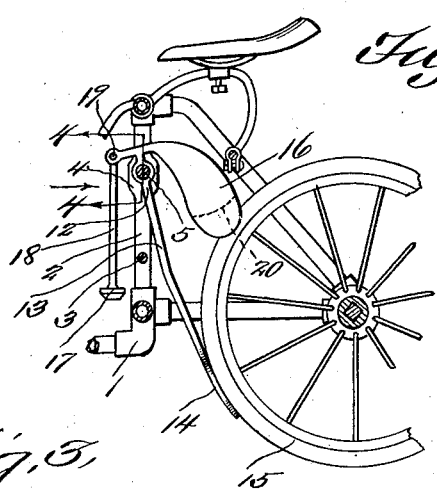
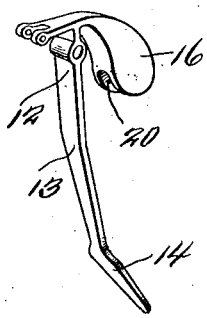
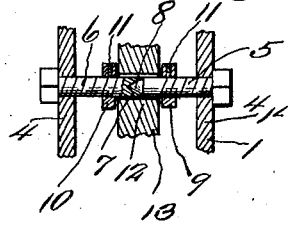
Witnesses
Edward S. Ford.
C. E. Clements.
Inventor
Patrick A. McCarty,
By R. A. Boswell & Co.,
his Attorneys

UNITED STATES PATENT OFFICE.

PATRICK A. McCARTY, OF HONESDALE, PENNSYLVANIA.

TRICYCLE BRAKE MECHANISM.

1,056,705. Specification of Letters Patent. Patented Mar. 18, 1913.

Application filed April 1, 1912. Serial No. 687,727.

*To all whom it may concern:*

Be it known that I, PATRICK A. MCCARTY, a citizen of the United States of America, residing at Honesdale, in the county of Wayne and State of Pennsylvania, have invented a new and useful Tricycle Brake Mechanism, of which the following is a specification.

This invention relates to a new and useful brake mechanism, particularly adapted for use upon bicycles and tricycles and the like, particularly the one shown, described and claimed in the application filed August 13, 1910, Serial No. 577,001.

The essential feature of the invention is the production of a gravitating releasing brake, designed to be applied manually by the operator. For instance, when the brake is applied to the drive wheel of the machine by the foot of the operator, the same is applied against the gravitation of the weighted portion of the brake and, when pressure is relieved upon the brake, the same is returned to its normal position by gravitation.

The invention comprises further features and combinations of parts hereinafter set forth, shown in the drawings and claimed.

In the drawings, Figure 1 is a view in perspective of a portion of a tricycle frame, showing the improved brake mechanism as applied thereto. Fig. 2 is a sectional view. Fig. 3 is a detail view of the weighted brake shoe. Fig. 4 is a sectional view on line 4—4 of Fig. 2.

Referring to the drawings, 1 designates a portion of the frame of a tricycle. As shown, this frame is provided with two vertical substantially parallel bars 2, suitably braced by the transverse bar 3. The bars 2 are provided with flattened portions 4. Threaded through the flattened portions 4 are the bolts 5 and 6. The bolt 6 has its shank at its end constructed with a cone-shaped recess 7, to receive the conical end 8 of the shank of the bolt 5, thereby constructing a substantially solid bar between the bars 2. Threaded on the shanks of the bolts 5 and 6 are collars 9 and 10, there being set screws 11 to hold the collars in adjusted positions. Pivoted on the shanks of the bolts 5 and 6 on their connecting ends is the brake member 12. This brake member is constructed with a shank 13, terminating in a brake shoe 14, adapted to be thrown in contact with the wheel 15. The brake member is constructed with a weight member 16, which constitutes means for throwing the brake shoe out of contact with the wheel 15, when pressure is relieved upon the foot-engaging plate 17 of the bar 18, which is pivoted at 19 to the brake member. To apply the brake shoe, foot pressure is applied upon the plate 17, which will oscillate the brake member, against the gravitation of the weight member 16. The weight member 16 is recessed at 20, to permit of the reception of the wheel 15.

From the foregoing, it will be noted that there has been devised a novel and efficient form of gravitating releasing brake, and one which has been found desirable and practical.

The invention having been set forth, what is claimed as new and useful is:—

In combination, a pair of substantially vertical parallel bars, bolts, one threaded through each of the bars, the bolts having their adjacent ends connected, a brake member pivoted upon the adjacent ends of the bolts, collars threaded on the bolts to hold the brake member centered, the brake member having a brake shoe and provided with gravitating means for throwing the brake shoe from contact with a driving wheel, and a bar pivoted to the brake member having foot-engaging means, whereby the brake member may be actuated.

In witness whereof, the applicant's signature is hereunto affixed in the presence of two witnesses.

PATRICK A. McCARTY.

Witnesses:
MARY W. HAM,
LENA HIST.

Copies of this patent may be obtained for five cents each, by addressing the "Commissioner of Patents, Washington, D. C."